US012603441B2

(12) United States Patent
Chakravarty et al.

(10) Patent No.: US 12,603,441 B2
(45) Date of Patent: Apr. 14, 2026

(54) METASURFACE BEAM STEERING ANTENNA AND METHOD OF SETTING ANTENNA BEAM ANGLE

(71) Applicant: Tata Consultancy Services Limited, Mumbai (IN)

(72) Inventors: Tapas Chakravarty, Kolkata (IN); Aman Kumar, Kolkata (IN); Arpan Pal, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 411 days.

(21) Appl. No.: 18/112,724

(22) Filed: Feb. 22, 2023

(65) Prior Publication Data

US 2023/0291119 A1 Sep. 14, 2023

(30) Foreign Application Priority Data

Mar. 14, 2022 (IN) ............................. 202221013901

(51) Int. Cl.
*H01Q 21/06* (2006.01)
*H01Q 3/38* (2006.01)
*H01Q 15/00* (2006.01)

(52) U.S. Cl.
CPC ............. *H01Q 21/065* (2013.01); *H01Q 3/38* (2013.01); *H01Q 15/002* (2013.01)

(58) Field of Classification Search
CPC ....... H01Q 15/002; H01Q 3/38; H01Q 21/065
See application file for complete search history.

(56) References Cited

U.S. PATENT DOCUMENTS 10,509,297 B2 12/2019 Kafaie Shirmanesh et al.
10,931,004 B2 2/2021 Yoo et al.
(Continued)

FOREIGN PATENT DOCUMENTS

CN 111430936 A 7/2020
KR 10-2130312 B1 7/2020

OTHER PUBLICATIONS

Alamzadeh et al., "A reconfigurable intelligent surface with integrated sensing capability," Scientific Reports, 11:20737 (2021).
(Continued)

*Primary Examiner* — Jack W Keith
*Assistant Examiner* — Clayton Paul Ridder
(74) *Attorney, Agent, or Firm* — Finnegan, Henderson, Farabow, Garrett & Dunner, LLP

(57) ABSTRACT

This disclosure relates generally to metasurface beam steering antenna and method of setting antenna beam angle. Conventional approaches perform electronically beam steering using phase array which requires bandwidth with higher data rates. The present disclosure enables metasurface antennas tilt antenna beam in a given direction, where the varactor diodes are operated in reverse bias so that different values of capacitors combination lead to electronic beam scanning. The processor of the metasurface beam steering antenna receives a command having an input angle to tilt the angle beam position. The processor processes the command by mapping the input angle with the set of c-shaped copper patch combination having the capacitor values using a predefined lookup table for setting the antenna beam angle based on a reference voltage generated by the varactor diode. The lookup table is iteratively updated with the capacitor values of the c-shaped copper patches.

10 Claims, 7 Drawing Sheets

(56) References Cited

U.S. PATENT DOCUMENTS

| | | | | |
|---|---|---|---|---|
| 11,070,269 | B2 | 7/2021 | Lee et al. | |
| 2016/0204514 | A1 * | 7/2016 | Miraftab | H01Q 21/005 343/731 |
| 2017/0170569 | A1 * | 6/2017 | Elad | H01Q 19/10 |
| 2018/0351250 | A1 * | 12/2018 | Achour | H01Q 21/064 |
| 2021/0091463 | A1 * | 3/2021 | Shahvirdi Dizaj Yekan | H01Q 3/36 |

OTHER PUBLICATIONS

Habaebi et al., "Beam Steering Antenna Array for 5G Telecommunication Systems Applications," Progress in Electromagnetics Research, 67:197-207 (2018).
Rotshild et al., "Innovative Reconfigurable Metasurface 2-D Beam-Steerable Reflector for 5G Wireless Communication," Electronics, 9 (2020).
Taghvaee et al., "Scalability Analysis of Programmable Metasurfaces for Beam Steering," 8 (2020).
Taravati et al., "Full-Duplex Reflective Beamsteering Metasurface Featuring Magnetless Nonreciprocal Amplification," (2021).
Tariq et al., "A Metasurface-Based MIMO Antenna for 5G Millimeter-Wave Applications," 9 (2021).
Vassos et al., "Air-bridged Schottky diodes for dynamically tunable millimeter-wave metamaterial phase shifters," Scientific Reports, 11:5988 (2021).

* cited by examiner (a) (b)

(c) (d)

METASURFACE BEAM STEERING ANTENNA AND METHOD OF SETTING ANTENNA BEAM ANGLE

PRIORITY CLAIM

This U.S. patent application claims priority under 35 U.S.C. § 119 to: Indian Patent Application No. 202221013901, filed on Mar. 14, 2022. The entire contents of the aforementioned application are incorporated herein by reference.

TECHNICAL FIELD

The disclosure herein generally relates to antenna calibration, and, more particularly, to metasurface beam steering antenna and method of setting antenna beam angle.

BACKGROUND

Meta materials are defined as artificial periodic structures which possess desirable electromagnetic properties that are not found in naturally occurring materials. High-gain antennas, mostly have a focused beam in the broadside direction. In several practical scenarios, it is often desired to transmit or receive signals from an offset angle away from the broadside direction. Beam forming network is an emerging technique for future of wireless communication towards specific receiving device having the signal spread in all direction from a broadcast antenna. Present generation of wireless communication depends on a sectoral beam radiated from base station, and $4^{th}$ generation electronically tilts antenna beam for targeted users which is challenging. With the advent of 5G New Radio, beam steering and beam forming networks are the major components of high speed, and low latency communications.

Traditionally, electronic beam-steering was performed using phased arrays antenna concept. Here, antennas were equally spaced into a regular arrangement. Each antenna element is separately fed through a digital phase shifter. In order to tilt the antenna beam at a given elevation angle, a progressive phase shift is introduced across the entire array of antennas. This phase shift and the direction of progression are adjusted to tilt the beams in any direction. Such method is precise and fast.

In $5^{th}$ generation, the operating spectrum has moved into millimeter wave (MMW). For example, 24-29 GHz frequency band is considered as frequency range2 (FR2) band in 5G. Here, the primary need is bandwidth requirement for higher data rates. It is envisioned that $6^{th}$ generation is likely to push the frequency beyond 100 GHz in search of bandwidth of 20 GHz. The need to push the frequency to the MMW introduces new challenges in the deployment of phased array scheme. At the MMW, excessive path loss is observed. This can be mitigated with higher antenna directive gain which in turn leads to significant increase in the number of antenna elements as well as space requirement. Such identical number of phase shifters results in exorbitant cost of deployment.

SUMMARY

Embodiments of the present disclosure present technological improvements as solutions to one or ore of the above-mentioned technical problems recognized by the inventors in conventional systems. For example, in one embodiment, a system for metasurface beam steering antenna and method of setting antenna beam angle is provided. In an aspect, there is provided a metasurface beam steering antenna system for setting antenna beam angle comprising: positioning the metasurface beam steering antenna horizontally in an XY plane comprising a set of c-shaped copper patches with predefined dimensions to transmit and receive RF waves, and a varactor diode positioned between each pair of c-shaped copper patches acting as equivalent capacitors for an input reverse bias voltage. The command received from a user interface being communicated to a processor of the metasurface beam steering antenna, the command having an input angle to tilt the position of the metasurface beam steering antenna. The processor of the metasurface beam steering antenna maps the input angle with the set of c-shaped copper patch combination having the capacitor values using a predefined lookup table for setting the antenna beam angle based on a reference voltage generated by the varactor diode.

In another aspect, there is provided a processor implemented method comprising the steps of: positioning the metasurface beam steering antenna horizontally in an XY plane comprising a set of c-shaped copper patches with predefined dimensions to transmit and receive RE waves, and a varactor diode positioned between each pair of c-shaped copper patches acting as equivalent capacitors for an input reverse bias voltage. The command received from a user interface being communicated to a processor 106 of the metasurface beam steering antenna, the command having an input angle to tilt the position of the metasurface beam steering antenna. The processor of the metasurface beam steering antenna maps the input angle with the set of c-shaped copper patch combination having the capacitor values using a predefined lookup table for setting the antenna beam angle based on a reference voltage generated by the varactor diode.

In accordance with an embodiment of the present disclosure, the processor 106 tilts the position of the metasurface beam steering antenna using the command received from the user interface.

In accordance with an embodiment of the present disclosure, the processor 106 selects the capacitor values embedded into the c-shaped copper patch combination which has higher peak gain to map the input angle based on a reverse bias voltage level of the varactor diode.

In accordance with an embodiment of the present disclosure, the processor 106 maps the capacitor values embedded into the c-shaped copper patch combination with the input angle associated with the lookup table.

In accordance with an embodiment of the present disclosure, the predefined lookup table is iteratively updated with the capacitor values of the c-shaped copper patches.

In accordance with an embodiment of the present disclosure, the processor performs antenna beam scanning with fine granularity.

In yet another aspect, a non-transitory computer readable medium provides one or more non-transitory machine-readable information storage mediums comprising one or more instructions, which when executed by one or more hardware processors perform actions includes an I/O interface and a memory coupled to the processor is capable of executing programmed instructions stored in the processor in the memory for positioning the metasurface beam steering antenna horizontally in an XY plane comprising a set of c-shaped copper patches with predefined dimensions to transmit and receive RF waves, and a varactor diode positioned between each pair of c-shaped copper patches acting as equivalent capacitors for an input reverse bias voltage.

The command received from a user interface being communicated to a processor of the metasurface beam steering antenna, the command having an input angle to tilt the position of the metasurface beam steering antenna. The processor of the metasurface beam steering antenna maps the input angle with the set of c-shaped copper patch combination having the capacitor values using a predefined lookup table for setting the antenna beam angle based on a reference voltage generated by the varactor diode.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
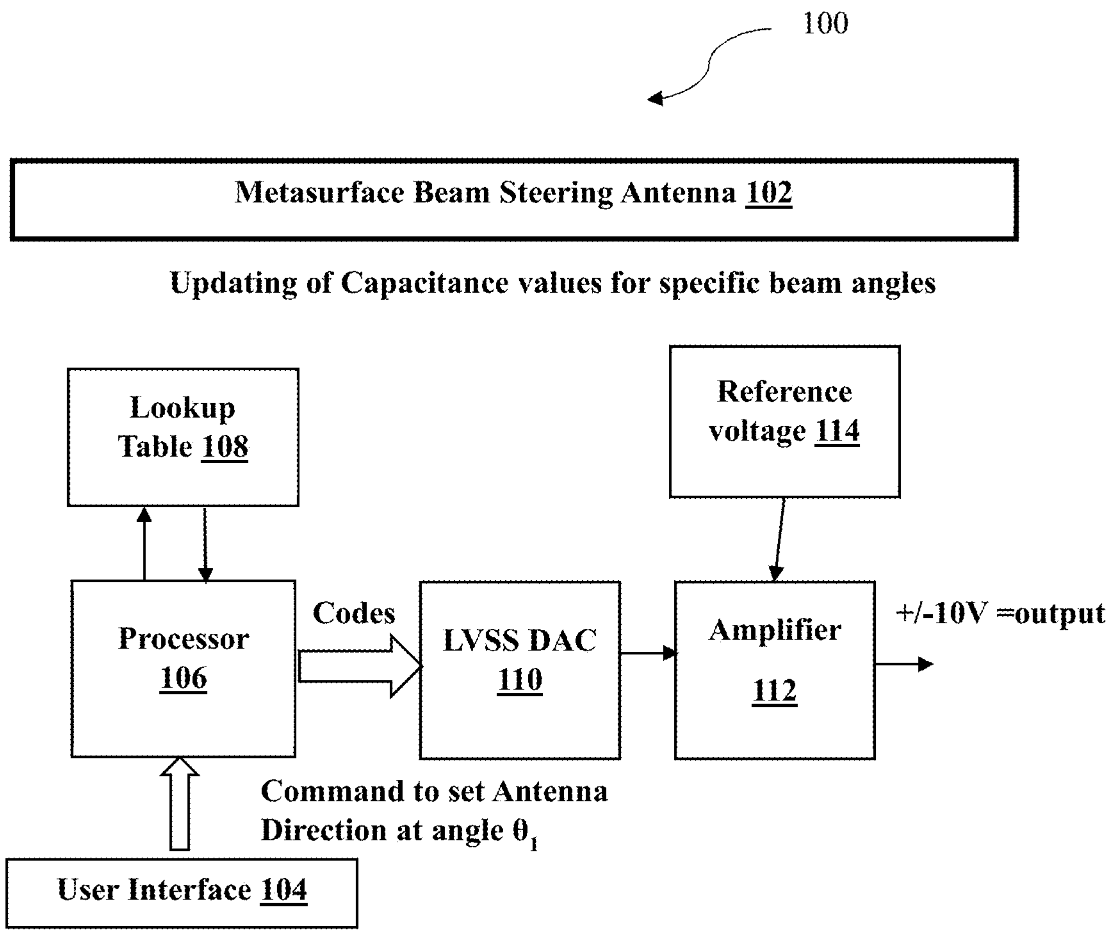
FIG. 1 illustrates an exemplary block diagram of a metasurface beam steering antenna according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Exemplary aspects of the present disclosure are directed to a metasurface beam steering antenna and method of setting antenna beam angle in wireless communication systems, such as 5G communication systems. For instance, an antenna system can include a plurality of different antenna arrays. Each antenna array can have a plurality of different antenna elements. The antenna elements can be shared between arrays to either provide a secondary function (for example multiple input multiple output (MING), diversity and thereof), to support main communication via a communication protocol (for example 5G communication protocol), or to support beam forming and/or beam steering.

The metasurface antenna is a repeating pattern of metallic inclusions on a dielectric substrate which consists of an electrically thin dielectric such as (RT-Duroid, FR4 types) in which repeating patterns of different shapes at a given size are usually constructed. These shapes are called unit cells. The antenna beam steering is affected by electronically tunable elements such as a varactor diodes or a PIN diodes. Each unit cell is of sub-wavelength in size and the separation between the unit cells is a key design parameter, Each unit cell can be controlled independently so that the reflected or transmitted electromagnetic wave can be manipulated.

Conventional techniques demonstrate a 2D structure of a single metasurface antenna comprising of tunable elements that can electronically scan the antenna beam. A major advantage of the said system is low cost phase shifters which allows antenna beam to be scanned in the phased array antenna that are completely avoided. In a typical design, the radio frequency (RF) is fed into standard antenna such as a microstrip patch antenna, printed dipole or printed-F antenna and thereof. The metasurface antenna is either used as the reflecting surface or the transmitting surface.

Referring now to the drawings, and more particularly to FIG. 1 through FIG. 6B, where similar reference characters denote corresponding features consistently throughout the figures, there are shown preferred embodiments and these embodiments are described in the context of the following exemplary system and/or method.

FIG. 1 illustrates an exemplary block diagram of a metasurface beam steering antenna according to some embodiments of the present disclosure. In an embodiment, the metasurface beam steering antenna 102 is positioned horizontally in an XY plane to receive and transmit radio waves. The metasurface beam steering antenna 102 comprises of a set of c-shaped copper patches with predefined dimensions and a varactor diode positioned between each pair of c-shaped copper patches acting as equivalent capacitors for an input reverse bias voltage. Capacitance values are obtained by setting a precise reverse bias voltage between the two terminals of the varactor diode. The processor 106 is configured to a lookup table 108 and a Low Voltage Single Supply (LVSS) Digital to Analog Converter (DAC) 110. The lookup table 108 includes one or more capacitor values which is embedded into the set of c-shaped copper patches combinations. The user interface 104 transmits a command for tilting the antenna position to the processor 106 for which the response is obtained from the lookup table 108. The varactor diode has the capacitances values, wherein the capacitances values are changed based on the reverse voltage level. For the response received from the lookup table 108 suitable capacitance value combination embedded into the set of c-shaped copper patches convert the capacitance values into appropriate voltage levels.

In order to tilt the antenna, beam effectively in a given direction; the varactor diodes are operated in reverse bias so that different values of capacitors can be set. A combination of such capacitance values leads to electronic beam scanning. However, unlike phased arrays there is no straight forward analytical method to determine the capacitance values combination which results in exact angle of tilt. Therefore, the metasurface antenna based electronic beam scanning at fine granularity sets appropriate combination of capacitance values using a lookup table.

Figure 2A:
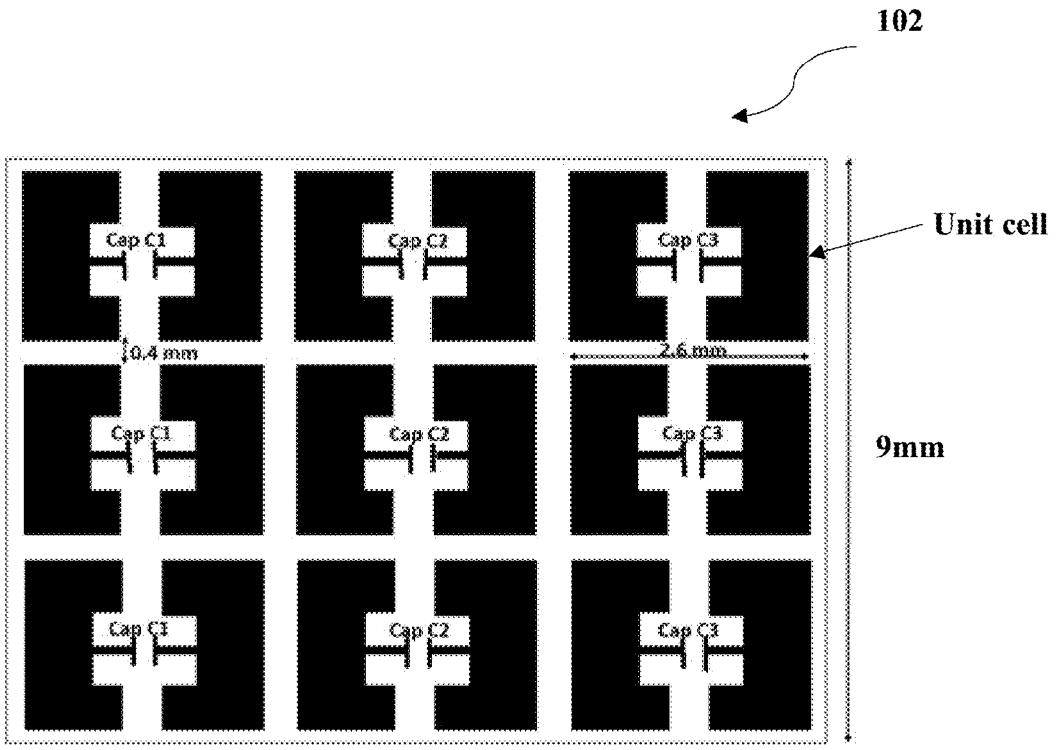
FIG. 2A and FIG. 2B illustrate an exemplary representation of a top view of m*n (for example 3×3) metasurface layer with individual capacitances across all the unit cells, respectively with reflecting metasurface according to some embodiments of the present disclosure.
Figure 2B:
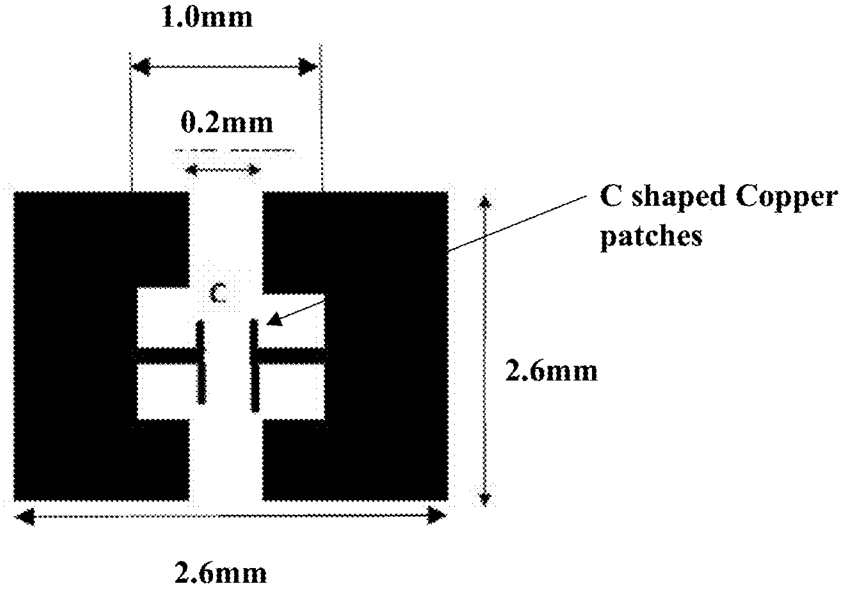

FIG. 2A and FIG. 2B illustrates an exemplary representation of a top view of m*n (for example 3×3) metasurface layer with individual capacitances across all the unit cells, respectively with reflecting metasurface according to some embodiments of the present disclosure. FIG. 2A represents the top view of m*n (for example 3×3) metasurface layer with individual capacitances across all the unit cells. The set of c-shaped copper patch with individual capacitances are placed row wise and column wise along the metasurface layer m*n (for example 3×3). The length plate of the metasurface antenna measures about 9 mm. Since, the capacitance values are identical along column the beam steering takes place only along Y axis. Each unit cell measures of about length 0.4 mm and width is of about 2.6 mm with different capacitance values c-shaped copper patch combination across rows and columns, the beam can steer along any elevation directions.

FIG. 2B represents the top view of unit cell of reflecting metasurface and the bottom side which is fully grounded. The role of capacitor in the unit cell is shown in FIG. 2B which changes the reflection phase at 26 GHz as measured on the metasurface plane. Two conducting plates placed parallel along each side have c-shaped copper patches embedded with capacitors. The bottom plate and the length of the metasurface antenna measures about 2.6 mm, in an example embodiment of the present disclosure. Top surface view of the two conducting plates measure about 0.2 mm and 1.0 mm, in an example embodiment of the present disclosure. Different capacitances offer different values at the same frequency. Thus, by selecting different values in adjacent unit cells, progressive phase shift is similar to phased array concept except the unit cell size and spacing sub-wavelength which is much lesser than λ/2. It is to be understood by person having ordinary skill in the art or person skilled in the art that the above measurements, values of unit cell size and spacing sub-wavelength shall not be construed as limiting the scope of the present disclosure. In other words, the measurements and values as mentioned above may vary depending upon the requirement and scenario or where the system 100 is deployed.

Figure 2C:
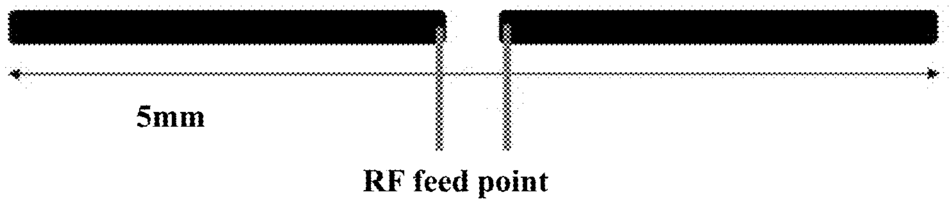
FIG. 2C and FIG. 2D illustrate an exemplary representation of excitor dipole antenna with a side view of m*n (for example 3×3) metasurface reflecting layer below dipole antenna according to some embodiments of the present disclosure.
Figure 2D:
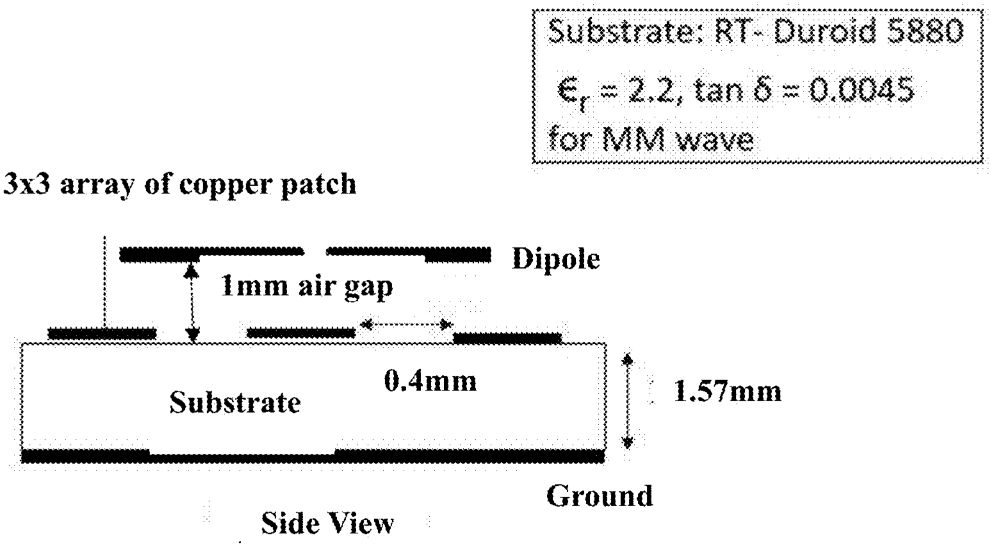

FIG. 2C and FIG. 2D illustrate an exemplary representation of excitor dipole antenna with a side view of m*n (for example 3×3) metasurface reflecting layer below dipole antenna according to some embodiments of the present disclosure. FIG. 2C represents standard dipole with two terminals for center feeding of RF 26 GHz. The standard excitor dipole antenna is of about 5 mm for RF feed point.

FIG. 2D is the side view of the m*n (for example 3×3) metasurface reflecting layer below dipole antenna with a distance air gap of about 1 mm between the dielectric substrate and the excitor dipole. The side view of the 3×3 metasurface antenna consists of single dipole antenna which is directly excited and the 3×3 metasurface reflector. The set of c-shaped copper patches are equally placed on top of the substrate with distance of about 0.4 mm. The metasurface patches are separated from the ground by the dielectric substrate which is RT Duroid 5880. The dipole antenna is placed at 1 mm separation from the metasurface (separated by air or low dielectric constant materials like Honeycomb). It is to be understood by person having ordinary skill in the art or person skilled in the art that the above measurements, and placement of these components shall not be construed as limiting the scope of the present disclosure. In other words, the measurements and placement as mentioned above may vary depending upon the requirement and scenario or where the system 100 is deployed.

Figure 3:
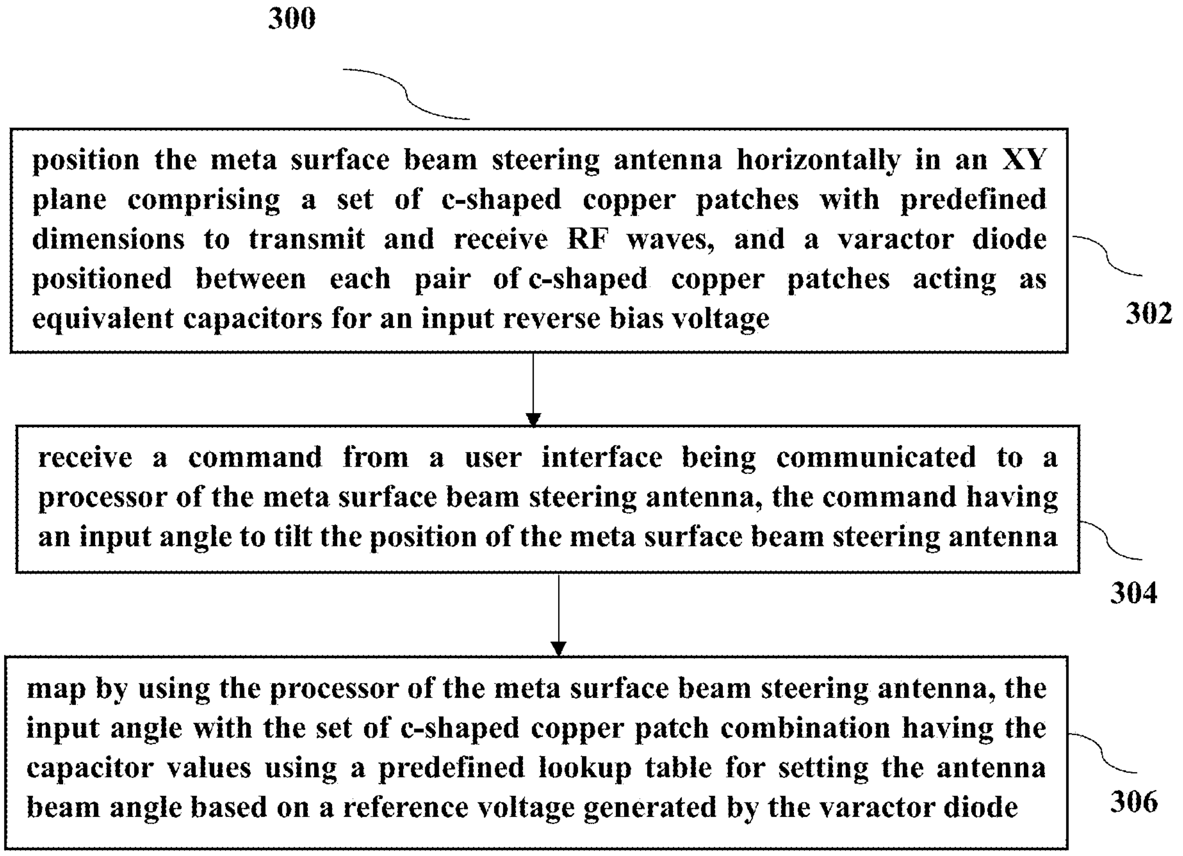
FIG. 3 is an exemplary flow diagram illustrating a method for metasurface beam steering antenna, in accordance with an embodiment of the present disclosure.

FIG. 3 is an exemplary flow diagram illustrating a method for metasurface beam steering antenna, in accordance with an embodiment of the present disclosure. The steps of the method 300 will now be explained in detail with reference to the components of the system 100 of FIG. 1. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

At step 302 of the method 300, the metasurface beam steering antenna 102 is positioned horizontally in an XY plane comprising a set of c-shaped copper patches with predefined dimensions to transmit and receive RF waves, and a varactor diode positioned between each pair of c-shaped copper patches acting as equivalent capacitors for an input reverse bias voltage.

At step 304 of the method 300, the user interface 104 configured to the processor 106 communicates a command received as input to the processor 106 of the metasurface beam steering antenna 102. The command comprises of an input angle to tilt the position of the metasurface beam steering antenna.

At step 306 of the method 300, the processor 106 of the metasurface beam steering antenna 102 maps the input angle with the set of c-shaped copper patch combination having the capacitor values using a predefined lookup table (Table 1) for setting the antenna beam angle based on a reference voltage generated by the varactor diode.

TABLE 1

| Lookup table | | | | |
|---|---|---|---|---|
| Antenna Beam direction | Peak Gain | C_set1 (in fF) | | |
| (theta degree) | (dB) | C1 | C2 | C3 |
| −54 deg | 4.74 | 272 | 400 | 300 |
| | 5.10 | 272 | 390 | 300 |
| −51 deg | 3.29 | 210 | 109 | 300 |
| | 5.28 | 232 | 109 | 330 |
| −50 deg | 6.45 | 109 | 232 | 400 |
| | 4.47 | 210 | 109 | 330 |
| | 5.04 | 272 | 390 | 330 |
| | 5.28 | 272 | 400 | 330 |
| | 5.80 | 272 | 330 | 300 |
| −49 deg | 6.30 | 109 | 232 | 390 |
| | 5.89 | 232 | 109 | 400 |
| −48 deg | 5.57 | 210 | 109 | 390 |
| −47 deg | 5.76 | 210 | 109 | 400 |
| −46 deg | 5.83 | 272 | 330 | 330 |
| | 6.72 | 109 | 232 | 330 |
| −45 deg | 6.45 | 109 | 210 | 390 |
| −44 deg | 6.45 | 109 | 210 | 330 |
| | 6.79 | 109 | 210 | 400 |
| −43 deg | 6.64 | 109 | 232 | 300 |

TABLE 1-continued

| Lookup table | | | | |
|---|---|---|---|---|
| Antenna Beam direction | Peak Gain | C_set1 (in fF) | | |
| (theta degree) | (dB) | C1 | C2 | C3 |
| −41 deg | 6.72 | 109 | 210 | 300 |
| −40 deg | 6.23 | 109 | 210 | 272 |
| | 6.71 | 109 | 232 | 272 |
| | 7.05 | 232 | 400 | 300 |
| | 7.95 | 232 | 400 | 330 |
| −39 deg | 4.20 | 109 | 109 | 272 |
| | 7.10 | 232 | 390 | 300 |
| | 7.98 | 232 | 390 | 330 |
| −38 deg | 8.34 | 232 | 400 | 390 |
| | 4.69 | 109 | 109 | 300 |
| | 2.69 | 109 | 210 | 232 |
| −37 deg | 8.26 | 232 | 390 | 390 |
| | 8.33 | 232 | 390 | 400 |
| −36 deg | 5.19 | 109 | 109 | 330 |
| −34 deg | 4.69 | 210 | 109 | 109 |
| | 4.90 | 232 | 109 | 109 |
| −33 deg | 5.44 | 109 | 109 | 390 |
| | 6.92 | 210 | 400 | 300 |
| | 7.74 | 210 | 400 | 330 |
| −32 deg | 5.52 | 109 | 109 | 400 |
| | 6.75 | 210 | 390 | 300 |
| | 7.56 | 210 | 390 | 330 |
| | 7.72 | 210 | 400 | 400 |
| −31 deg | 4.28 | 109 | 109 | 210 |
| | 6.05 | 109 | 232 | 232 |
| | 7.83 | 210 | 390 | 390 |
| | 7.92 | 210 | 400 | 390 |
| −30 deg | 7.25 | 109 | 330 | 300 |
| | 5.66 | 210 | 400 | 272 |
| | 7.46 | 210 | 390 | 400 |
| −28 deg | 8.03 | 232 | 330 | 400 |
| −27 deg | 8.05 | 232 | 330 | 390 |
| −25 deg | 5.15 | 109 | 232 | 210 |
| | 7.59 | 232 | 330 | 330 |
| −24 deg | 6.79 | 210 | 330 | 330 |
| | 6.87 | 210 | 330 | 390 |
| −21 deg | 6.03 | 109 | 272 | 210 |
| | 7.18 | 232 | 330 | 300 |
| −20 deg | 6.42 | 210 | 330 | 300 |
| | 6.81 | 210 | 330 | 400 |
| | 6.27 | 272 | 300 | 330 |
| −17 deg | 6.54 | 109 | 300 | 210 |
| −16 deg | 7.11 | 109 | 390 | 390 |
| | 7.38 | 210 | 390 | 210 |
| −15 deg | 6.87 | 109 | 400 | 330 |
| | 7.11 | 109 | 400 | 390 |
| | 6.06 | 210 | 300 | 330 |
| | 7.38 | 232 | 400 | 210 |
| −14 deg | 6.54 | 109 | 390 | 300 |
| | 6.91 | 109 | 390 | 330 |
| −13 deg | 2.70 | 300 | 210 | 232 |
| | 5.55 | 210 | 300 | 300 |
| | 4.59 | 210 | 330 | 272 |
| −12 deg | 6.74 | 109 | 330 | 210 |
| | 6.70 | 232 | 330 | 210 |
| −11 deg | 6.43 | 109 | 272 | 232 |
| | 5.59 | 210 | 300 | 390 |
| | 6.04 | 210 | 300 | 400 |
| −10 deg | 5.81 | 300 | 232 | 232 |
| | 3.93 | 272 | 109 | 232 |
| −9 deg | 7.37 | 109 | 330 | 390 |
| | 7.32 | 109 | 330 | 400 |
| | 6.28 | 109 | 400 | 210 |
| −8 deg | 6.77 | 300 | 272 | 109 |
| | 7.43 | 232 | 300 | 330 |
| −7 deg | 7.24 | 109 | 330 | 330 |
| | 2.21 | 272 | 210 | 232 |
| | 5.65 | 300 | 232 | 210 |
| −6 deg | 6.78 | 109 | 390 | 210 |
| | 7.12 | 109 | 300 | 232 |
| | 5.30 | 210 | 300 | 272 |
| | 7.24 | 232 | 300 | 390 |
| | 7.53 | 232 | 300 | 400 |
| | 4.37 | 300 | 109 | 272 |

TABLE 1-continued

| Lookup table | | | | |
|---|---|---|---|---|
| Antenna Beam direction | Peak Gain | C_set1 (in fF) | | |
| (theta degree) | (dB) | C1 | C2 | C3 |
| −5 deg | 7.04 | 232 | 390 | 109 |
| | 7.43 | 232 | 330 | 272 |
| | 7.07 | 272 | 300 | 300 |
| −4 deg | 5.33 | 210 | 272 | 300 |
| | 6.00 | 272 | 232 | 232 |
| | 7.76 | 300 | 272 | 272 |
| −3 deg | 7.44 | 109 | 300 | 390 |
| | 7.34 | 109 | 300 | 400 |
| | 5.02 | 210 | 272 | 272 |
| | 6.03 | 272 | 232 | 210 |
| −2 deg | 7.50 | 109 | 330 | 232 |
| | 7.48 | 272 | 300 | 109 |
| 0 deg | 7.42 | 400 | 400 | 400 |
| 2 deg | 6.45 | 272 | 390 | 232 |
| | 3.31 | 272 | 210 | 272 |
| | 7.39 | 300 | 272 | 400 |
| | 7.46 | 232 | 330 | 109 |
| 3 deg | 7.21 | 109 | 390 | 232 |
| | 7.19 | 109 | 400 | 232 |
| | 6.27 | 272 | 400 | 109 |
| | 7.32 | 300 | 272 | 390 |
| 4 deg | 5.41 | 210 | 232 | 272 |
| | 7.37 | 232 | 272 | 330 |
| | 6.94 | 272 | 232 | 300 |
| | 8.01 | 272 | 300 | 390 |
| | 7.15 | 300 | 330 | 109 |
| | 7.79 | 300 | 272 | 330 |
| 5 deg | 6.40 | 109 | 272 | 272 |
| | 6.69 | 210 | 400 | 109 |
| | 5.33 | 210 | 232 | 232 |
| | 4.94 | 272 | 330 | 210 |
| | 5.06 | 300 | 272 | 210 |
| | 5.71 | 300 | 390 | 330 |
| 6 deg | 6.31 | 272 | 390 | 109 |
| | 7.43 | 272 | 330 | 232 |
| | 4.37 | 272 | 109 | 300 |
| | 6.55 | 300 | 232 | 330 |
| | 6.92 | 300 | 330 | 390 |
| | 7.06 | 300 | 330 | 400 |
| 7 deg | 6.94 | 109 | 272 | 330 |
| | 6.99 | 109 | 272 | 390 |
| | 5.65 | 210 | 300 | 232 |
| | 5.78 | 210 | 272 | 390 |
| | 5.46 | 210 | 272 | 400 |
| | 4.05 | 272 | 210 | 300 |
| 8 deg | 7.20 | 109 | 390 | 272 |
| | 5.61 | 210 | 232 | 300 |
| | 6.77 | 272 | 232 | 330 |
| | 5.10 | 300 | 210 | 330 |
| 9 deg | 6.59 | 109 | 272 | 300 |
| | 6.70 | 210 | 390 | 109 |
| | 2.01 | 232 | 210 | 272 |
| | 5.75 | 272 | 300 | 210 |
| 10 deg | 3.91 | 232 | 109 | 272 |
| | 6.59 | 300 | 390 | 390 |
| | 7 | 232 | 300 | 109 |
| 11 deg | 6.44 | 300 | 400 | 109 |
| | 4.67 | 272 | 109 | 330 |
| | 7.50 | 232 | 272 | 390 |
| 12 deg | 6.51 | 300 | 390 | 109 |
| | 5.66 | 210 | 232 | 330 |
| | 7.49 | 232 | 272 | 400 |
| | 6.04 | 232 | 272 | 109 |
| 13 deg | 6.59 | 109 | 400 | 300 |
| | 7.45 | 210 | 400 | 232 |
| | 4.50 | 272 | 210 | 330 |
| 14 deg | 6.82 | 210 | 330 | 109 |
| | 6.28 | 210 | 330 | 232 |
| | 2.96 | 232 | 210 | 300 |
| | 5.02 | 272 | 330 | 390 |
| | 5.26 | 300 | 109 | 390 |
| | 5.26 | 300 | 109 | 400 |
| | 6.23 | 300 | 210 | 400 |

TABLE 1-continued

| Lookup table | | | | |
|---|---|---|---|---|
| Antenna Beam direction | Peak Gain | C_set1 (in fF) | | |
| (theta degree) | (dB) | C1 | C2 | C3 |
| 15 deg | 7.37 | 210 | 390 | 232 |
| | 5.61 | 300 | 210 | 390 |
| 16 deg | 6.84 | 272 | 232 | 390 |
| | 5.20 | 210 | 390 | 272 |
| 17 deg | 6.51 | 210 | 300 | 109 |
| | 6.13 | 300 | 232 | 390 |
| | 6.23 | 300 | 232 | 400 |
| 18 deg | 3.32 | 232 | 210 | 330 |
| | 4.86 | 272 | 109 | 390 |
| | 5.23 | 272 | 210 | 390 |
| | 4.93 | 272 | 390 | 390 |
| | 5.04 | 272 | 390 | 400 |
| | 5.13 | 272 | 400 | 400 |
| 19 deg | 5.44 | 272 | 210 | 400 |
| 20 deg | 6.06 | 300 | 330 | 210 |
| | 7.22 | 300 | 330 | 232 |
| | 5.96 | 210 | 232 | 400 |
| | 5.70 | 210 | 232 | 390 |
| | 5.89 | 210 | 272 | 109 |
| 23 deg | 4.24 | 232 | 210 | 390 |
| 26 deg | 5.43 | 210 | 232 | 109 |
| 29 deg | 5.38 | 272 | 390 | 210 |
| 31 deg | 5.46 | 272 | 400 | 210 |
| 33 deg | 6.85 | 300 | 400 | 210 |
| | 4.99 | 109 | 109 | 232 |
| 34 deg | 6.75 | 300 | 390 | 210 |
| 38 deg | 4.69 | 300 | 109 | 109 |
| 39 deg | 6.95 | 300 | 390 | 232 |
| 40 deg | 4.13 | 272 | 109 | 109 |
| | 6.54 | 272 | 232 | 109 |
| 42 deg | 6.49 | 300 | 232 | 109 |
| 43 deg | 4.81 | 272 | 210 | 109 |
| 44 deg | 5.05 | 300 | 210 | 109 |
| 50 deg | 5.64 | 300 | 330 | 272 |
| 51 deg | 3.30 | 300 | 109 | 210 |
| 53 deg | 4.24 | 300 | 109 | 232 |
| 55 deg | 4.94 | 300 | 390 | 272 |
| | 4.59 | 300 | 400 | 272 |

In accordance with an embodiment of the present disclosure, the processor 106 tilts the position of the metasurface beam steering antenna using the command received from the user interface.

In one embodiment, the processor 106 selects the capacitor values embedded into the c-shaped copper patch combination which has higher peak gain to map the input angle based on a reverse bias voltage level of the varactor diode.

In another embodiment, the processor 106 maps the capacitor values embedded into the c-shaped copper patch combination with the input angle associated with the lookup table. The processor 106 performs antenna beam scanning with fine granularity.

In another embodiment, the predefined lookup table is iteratively updated with the capacitor values of the c-shaped copper patches.

In one embodiment, the operation principle of the said system is described below by way of the following steps, Step 1—The processor 106 receives a command from the user interface 104 to set the antenna at an angle θ1.

Step 2—The processor 106 maps the input value of θ1 to the set of capacitors C1, C2 and C3 as stored in the lookup table.

Step 3—There are multiple possible combinations of capacitors for the same angle 81, the "processor" 106 selects one combination which is associated with higher peak gain value.

Step 4—When the angle setting accuracy requirement is one degree or less (for example 0.50), it is possible that the precise capacitance value requirement cannot be met due to quantization of voltage steps and intrinsic noise on the DC driving voltages.

Step 5—When the system requirement is as Step 4, the "Processor" will select the capacitor combination which is achievable, thus sacrificing the selection criteria of opting for peak gain only.

Step 6—Intermittent in-line antenna calibration is to be conducted which will update the lookup table on a continuous basis so that the component degradation effects can be taken care of.

In one embodiment, when the diode is reverse biased (where Cathode is given positive DC bias and Anode is grounded), the net effect is the capacitance between the two terminals whose exact value depends on the potential difference between the two terminals.

For the given diode, the capacitance varies between 0.2 pF @10V to 1.1 pF@0V. However, design consideration for setting precise capacitance values is the intrinsic non-linearity of the diode. Such non-linearity effects are displayed by all active elements and not specific to the choice of the diode. Considerably, diode driving voltage is set by computing processor 106 using the DAC. Here, a 12-bit or 16-bit LVSS DAC is followed by an amplifier to generate +/−10V swing.

Figure 4A:
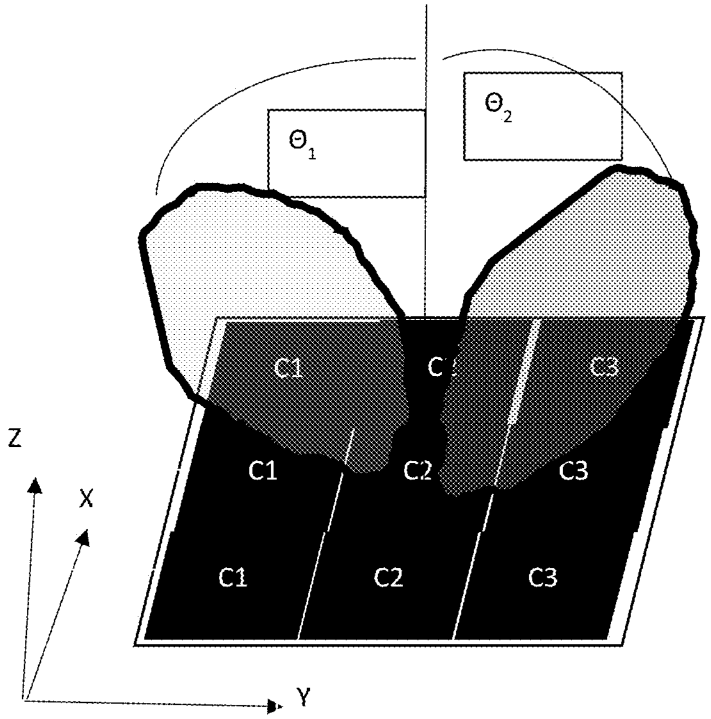
FIG. 4A and FIG. 4B illustrates a beam scanning representation along Y axis with capacitor values embedded into a c-shaped copper patch combination and setting antenna beam angles using varactor diodes in accordance with some embodiments of the present disclosure.
Figure 4B:
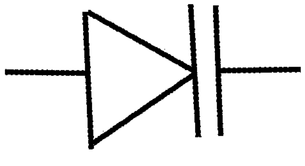
Figure 5:
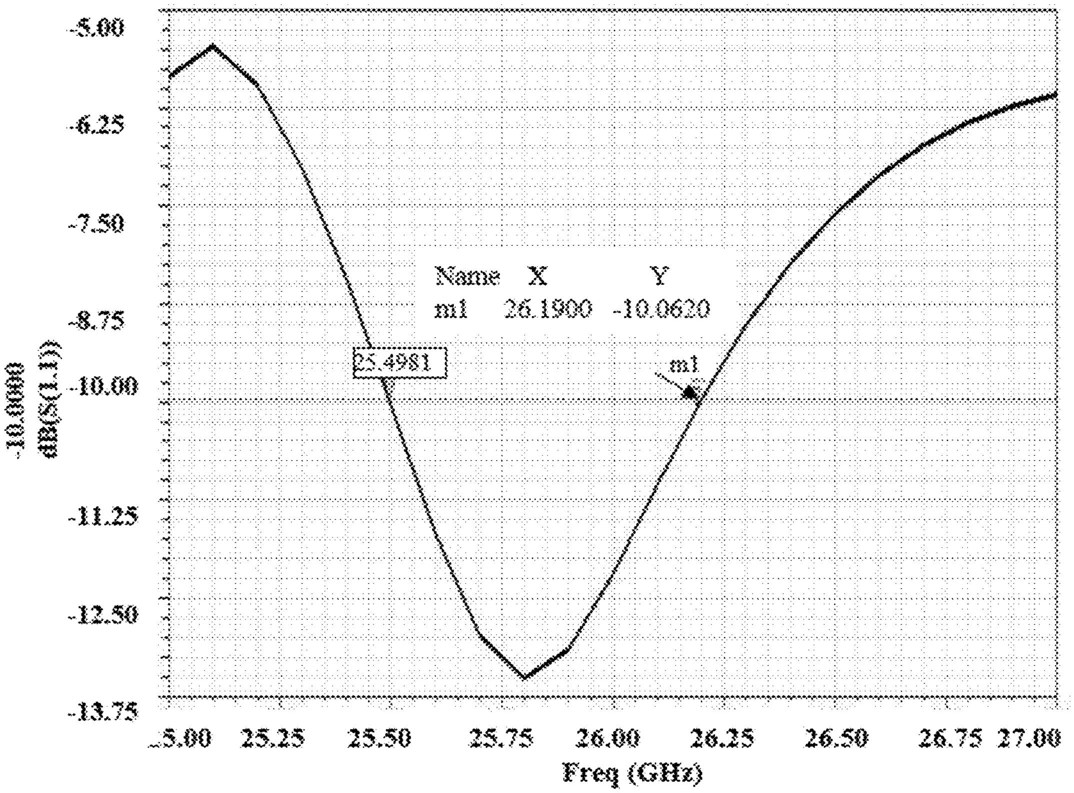
FIG. 5 is a Reflection Coefficient curve that illustrates impedance matching for its return loss characteristics considering one set of capacitance values (C1=232fF, C2=400fF, C3=330fF) of the microstrip antenna in MMW frequency range in accordance with some embodiments of the present disclosure.

FIG. 4A and FIG. 4B illustrates a beam scanning representation along Y axis with capacitor values embedded into a c-shaped copper patch combination and setting antenna beam angles using varactor diodes in accordance with some embodiments of the present disclosure. The dipole's placement is aligned to centrally located on the 2D surface of 9 unit cells as shown in FIG. 4A. The schematic structure depicts a set of 3 capacitance values such as C1, C2 and C3 in column 1, 2 and 3 respectively, Here, the antenna beam will tilt along +/− Y direction. Similarly, if these capacitors are placed along rows (keeping capacitor value across the entire row as same, then beam will tilt along +/−X direction. The angle of tilt is determined by a progressive change in the capacitance values, FIG. 5 is a Reflection Coefficient curve that illustrates impedance matching for its return loss characteristics considering one set of capacitance values (C1=232fF, C2=400fF, C3=330fF) of the microstrip antenna in MMW frequency range in accordance with some embodiments of the present disclosure. The antenna structure has been simulated for its return loss characteristics considering one set of capacitance values such as (C1=232fF, C2=400fF, C3=330fF) to observe the impedance matching in MMW frequency regime. However, the return loss for other combination of capacitances is also observed. It is noted that FIG. 6A and FIG. 6B is below −10 dB over the span of 25.49-26.19 GHz.

Figure 6A:
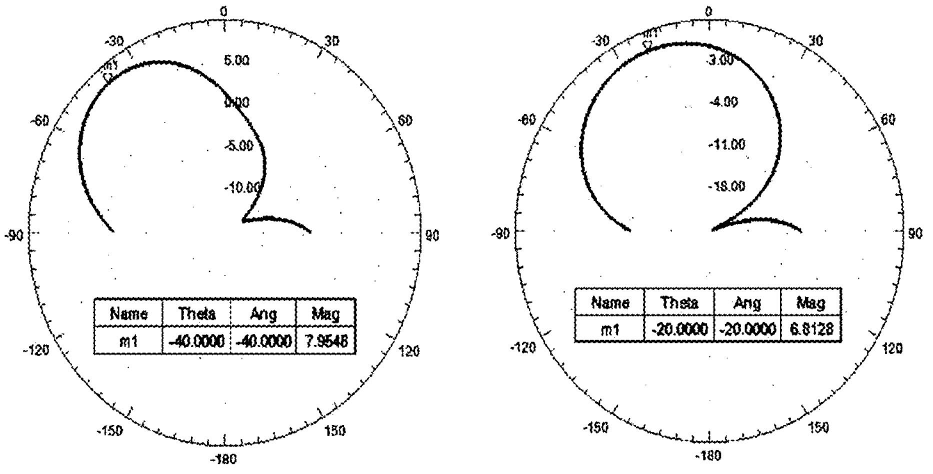
FIG. 6A and FIG. 6B is a 2-Dimensional radiation pattern at 26 GHz frequency of the microstrip antenna for various values of capacitances and inclination angle of metasurface in accordance with some embodiments of the present disclosure.
Figure 6B:
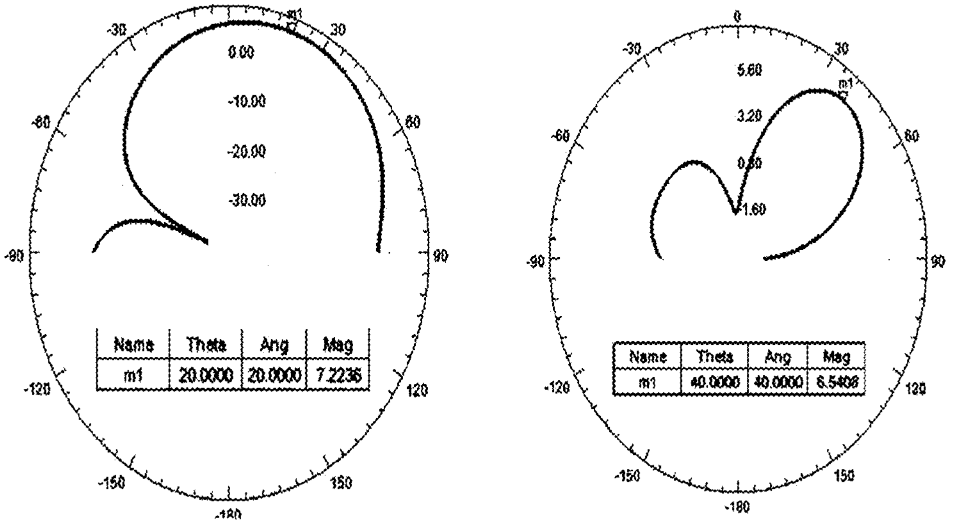

FIG. 6A and FIG. 6B are a 2-Dimensional radiation pattern at 26 GHz frequency of the microstrip antenna for various values of inclination angle of metasurface in accordance with some embodiments of the present disclosure. The present antenna system shows beam steering operation when different set of capacitance values are taken into the metasurface structure. The lookup table has different combinations of capacitance values leading to different beam steering angles. Some of the different combinations are taken from the lookup table to show the beam steering behavior of the antenna system by looking into the radiation pattern at the frequency of interest 26 GHz. FIG. 6A and FIG. 6B describe 2-Dimensional radiation pattern at frequency 26 GHz for the set of capacitances: (a) c1=232fF, C2=400fF, C3=330fF, (b) c1=210fF, C2=330fF, C3=400fF, (c)

c1=300fF, C2=330fF, C3=232fF and, (d) c1=272fF, C2=232fF, C3=109fF, Further, it is seen that different set of capacitances leads to the beam offset angle of −40 deg, −20 deg, +20 deg and +40 degree as shown respectively. The radiation pattern for other combination of capacitances is also observed and thus, beam steering can be achieved by taking different set of capacitances in a metasurface structure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or f they include equivalent elements with insubstantial differences from the literal language of the claims.

The embodiments of present disclosure herein address unresolved problem of antenna calibration. The embodiments, thus provide a metasurface beam steering antenna and method of setting antenna beam angle. Moreover, the embodiments herein further tilt antenna position using the predefined lookup table. The metasurface beam steering antenna enables antenna beam scanning at fine granularity with 1° degree spacing. The antenna beam precisely tilts antenna position at a given angle using the predefined lookup table. The metasurface patches are separated from ground by a dielectric substrate and different capacitances offer different values at the same frequency. Thus, by selecting different values in adjacent unit cells, progressive phase shift similar to phased array, the unit cell size and spacing are sub-wavelength which is much less than λ/2.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms “a,” “an,” and “the” include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored, Thus, a computer-readable storage medium may store instructions for execution by one or more processors, including instructions for causing the processor(s) to perform steps or stages consistent with the embodiments described herein. The term “computer-readable medium” should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A system for setting antenna beam angle of a metasurface beam steering antenna, comprising: a metasurface beam steering antenna, positioned horizontally in an XY plane further comprising a set of c-shaped copper patches with predefined dimensions to transmit and receive RF waves, and a varactor diode positioned between each pair of c-shaped copper patches acting as equivalent capacitors for an input reverse bias voltage, wherein the metasurface beam steering antenna comprises a repeating pattern of a plurality of unit cells, each unit cell of the plurality of unit cells are controlled independently to manipulate the transmitted and the received RF waves, wherein the metasurface beam steering antenna comprises two layers, wherein the top layer is an excitor and the bottom layer is a reflector; One or more processors are configured to: receive a command from a user interface, the command having an input angle value to tilt a position of the metasurface beam steering antenna; and map, the input angle with a combination of c-shaped copper patches each comprising capacitor values, using a predefined lookup table for setting the antenna beam angle based on a reference voltage generated by the varactor diode, wherein to map the input angle with the combination of c-shaped copper patches, the one or more processors are configured to: select the capacitor values set to the c-shaped copper patch combination which has highest peak gain among the available c-shaped copper combinations to map the input angle based on a reverse bias voltage level of the varactor diode, wherein the c-shaped copper patches are separated from ground by a dielectric substrate, wherein each c-shaped copper patch combination may offer different capacitor values at the same frequency, wherein the different capacitor values are selected in adjacent unit cells of the metasurface beam steering antenna, wherein each unit cell size and spacing sub-wavelength being less than λ/2, wherein the predefined lookup table is iteratively updated with the selected capacitor values of the c-shaped copper patches combination, wherein the capacitor values set to the c-shaped copper patch combination are mapped with the input angle associated with the lookup table.

2. The system of claim 1, wherein the processor is configured to tilt the position of the metasurface beam steering antenna using the command received from the user interface.

3. The system of claim 1, wherein the processor is configured to perform antenna beam scanning with fine granularity.

4. The system of claim 1, wherein the metasurface beam steering antenna enables the antenna beam scanning at fine granularity with 1° degree spacing, wherein the antenna beam precisely tilts antenna position at a given angle using the predefined lookup table.

5. A processor implemented method for setting antenna beam angle of metasurface beam steering antenna, the processor implemented method further comprising the steps of: receiving by a processor a command from a user interface, the command having an input angle value to tilt a position of a metasurface beam steering antenna, wherein the metasurface beam steering antenna is positioned horizontally in an XY plane further comprising a set of c-shaped copper patches with predefined dimensions to transmit and receive RF waves, and a varactor diode positioned between each pair of c-shaped copper patches acting as equivalent capacitors for an input reverse bias voltage, wherein the metasurface beam steering antenna comprises a repeating pattern of a plurality of unit cells, each unit cell of the plurality of unit cells are controlled independently to manipulate the transmitted and the received RF waves, wherein the metasurface beam steering antenna comprises two layers, wherein the top layer is an excitor and the bottom layer is a reflector; and mapping by using a processor, the input angle with a combination of c-shaped copper patches each comprising capacitor values, using a predefined lookup table for setting the antenna beam angle based on a reference voltage generated by the varactor diode, wherein to map the input angle with the combination of c-shaped copper patches, the one or more processors are configured to: select the capacitor values set to the c-shaped copper patch combination which has highest peak gain among the available c-shaped copper patch combinations to map the input angle based on a reverse bias voltage level of the varactor diode, wherein the c-shaped copper patches are separated from ground by a dielectric substrate, wherein each c-shaped copper patch combination may offer different capacitor values at the same frequency, wherein the different capacitor values are selected in adjacent unit cells of the metasurface beam steering antenna, wherein each unit cell size and spacing sub-wavelength being less than λ/2, wherein the predefined lookup table is iteratively updated with the selected capacitor values of the c-shaped copper patches combination, wherein the capacitor values set to the c-shaped copper patch combination are mapped with the input angle associated with the lookup table.

6. The processor implemented method as claimed in claim 5, wherein the processor is configured to tilt the position of the metasurface beam steering antenna using the command received from the user interface.

7. The processor implemented method as claimed in claim 5, wherein the processor is configured to perform antenna beam scanning with fine granularity.

8. One or more non-transitory machine-readable information storage mediums comprising one or more instructions which when executed by one or more hardware processors cause: receiving a command from a user interface, the command having an input angle value to tilt a position of a metasurface beam steering antenna, wherein the metasurface beam steering antenna is positioned horizontally in an XY plane further comprising a set of c-shaped copper patches with predefined dimensions to transmit and receive RF waves, and a varactor diode positioned between each pair of c-shaped copper patches acting as equivalent capacitors for an input reverse bias voltage, wherein the metasurface beam steering antenna comprises a repeating pattern of a plurality of unit cells, each unit cell of the plurality of unit cells are controlled independently to manipulate the transmitted and the received RF waves, wherein the metasurface beam steering antenna comprises two layers, wherein the top layer is an excitor and the bottom layer is a reflector; and mapping by using a processor, the input angle with a combination of c-shaped copper patches each comprising capacitor values, using a predefined lookup table for setting the antenna beam angle based on a reference voltage generated by the varactor diode, wherein to map the input angle with the combination of c-shaped copper patches, the one or more processors are configured to: select the capacitor values set to the c-shaped copper patch combination which has highest peak gain among the available c-shaped copper patch combinations to map the input angle based on a reverse bias voltage level of the varactor diode, wherein the c-shaped copper patches are separated from ground by a dielectric substrate, wherein each c-shaped copper patch combination may offer different capacitor values at the same frequency, wherein the different capacitor values are selected in adjacent unit cells of the metasurface beam steering antenna, wherein each unit cell size and spacing sub-wavelength being less than λ/2, wherein the predefined lookup table is iteratively updated with the selected capacitor values of the c-shaped copper patches combination, wherein the capacitor values set to the c-shaped copper patch combination are mapped with the input angle associated with the lookup table.

9. The one or more non-transitory machine-readable information storage mediums of claim 8, wherein the processor is configured to tilt the position of the metasurface beam steering antenna using the command received from the user interface.

10. The one or more non-transitory machine-readable information storage mediums of claim 8, wherein the processor is configured to perform antenna beam scanning with fine granularity.

* * * * *